(12) United States Patent
Choi et al.

(10) Patent No.: US 11,196,051 B2
(45) Date of Patent: Dec. 7, 2021

(54) POSITIVE ELECTRODE FOR SECONDARY BATTERY AND SECONDARY BATTERY INCLUDING THE SAME

(71) Applicant: LG Chem, Ltd., Seoul (KR)

(72) Inventors: Young Geun Choi, Daejeon (KR); Hyo Sik Kim, Daejeon (KR); Joo Yul Baek, Daejeon (KR); Song Taek Oh, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 15/754,479

(22) PCT Filed: Nov. 30, 2016

(86) PCT No.: PCT/KR2016/014002
§ 371 (c)(1),
(2) Date: Feb. 22, 2018

(87) PCT Pub. No.: WO2017/095151
PCT Pub. Date: Jun. 8, 2017

(65) Prior Publication Data
US 2018/0248195 A1    Aug. 30, 2018

(30) Foreign Application Priority Data

Nov. 30, 2015   (KR) .................. 10-2015-0169150
Nov. 30, 2016   (KR) .................. 10-2016-0161525

(51) Int. Cl.
*H01M 4/62*    (2006.01)
*H01M 4/36*    (2006.01)
(Continued)

(52) U.S. Cl.
CPC ........... *H01M 4/625* (2013.01); *C01B 32/158* (2017.08); *H01M 4/0404* (2013.01);
(Continued)

(58) Field of Classification Search
None
See application file for complete search history.

(56) References Cited

U.S. PATENT DOCUMENTS

2006/0134326 A1    6/2006  Watanabe et al.
2009/0181309 A1    7/2009  Kwon et al.
(Continued)

FOREIGN PATENT DOCUMENTS

CN    104067421 A         9/2014
JP    2006286427 A    *  10/2006
(Continued)

OTHER PUBLICATIONS

Search report from International Application No. PCT/KR2016/014002, dated Mar. 7, 2017.
(Continued)

*Primary Examiner* — Zhongqing Wei
(74) *Attorney, Agent, or Firm* — Lerner, David, Littenberg, Krumholz & Mentlik, LLP

(57) ABSTRACT

Provided are a positive electrode for a secondary battery which includes a positive electrode collector, a porous positive electrode active material layer disposed on a surface of the positive electrode collector and including a positive electrode active material and first carbon nanotubes, and a conductive layer disposed on a surface of the positive electrode active material layer, wherein the conductive layer includes a porous network structure formed by a plurality of second carbon nanotubes and has a porosity equal to or greater than a porosity of the positive electrode active material layer +10 vol %, and a secondary battery including the same.

14 Claims, 9 Drawing Sheets

(51) Int. Cl.
*H01M 4/525* (2010.01)
*H01M 4/505* (2010.01)
*H01M 4/04* (2006.01)
*H01M 4/1391* (2010.01)
*H01M 10/0525* (2010.01)
*H01M 4/131* (2010.01)
*C01B 32/158* (2017.01)
*H01M 4/02* (2006.01)
*B82Y 30/00* (2011.01)
*B82Y 40/00* (2011.01)

(52) U.S. Cl.
CPC ......... *H01M 4/0416* (2013.01); *H01M 4/131* (2013.01); *H01M 4/1391* (2013.01); *H01M 4/364* (2013.01); *H01M 4/366* (2013.01); *H01M 4/505* (2013.01); *H01M 4/525* (2013.01); *H01M 10/0525* (2013.01); *B82Y 30/00* (2013.01); *B82Y 40/00* (2013.01); *H01M 2004/021* (2013.01); *H01M 2004/028* (2013.01); *Y10S 977/742* (2013.01); *Y10S 977/842* (2013.01); *Y10S 977/948* (2013.01)

(56) References Cited

U.S. PATENT DOCUMENTS

| | | |
|---|---|---|
| 2014/0013584 A1 | 1/2014 | Wang et al. |
| 2014/0087255 A1 | 3/2014 | Kim et al. |
| 2014/0093769 A1 | 4/2014 | Busnaina et al. |
| 2014/0370351 A1* | 12/2014 | Kwon ................... H01M 4/02 429/94 |
| 2015/0118555 A1* | 4/2015 | Akikusa ............... H01M 4/505 429/217 |
| 2015/0273441 A1* | 10/2015 | Kim ................... B01J 23/8472 428/402 |

FOREIGN PATENT DOCUMENTS

| | | |
|---|---|---|
| JP | 2006286427 A | 10/2006 |
| JP | 5070680 B2 | 11/2012 |
| JP | 2014093192 A | 5/2014 |
| JP | 2014238944 A | 12/2014 |
| JP | 6197384 B2 | 9/2017 |
| KR | 20050052266 A | 6/2005 |
| KR | 20140132308 A | 11/2014 |
| KR | 101478814 B1 | 1/2015 |
| KR | 101494435 B1 | 2/2015 |
| KR | 20150027027 A | 3/2015 |
| KR | 101567970 B1 | 11/2015 |
| WO | 2015047042 A1 | 4/2015 |

OTHER PUBLICATIONS

Extended European Search Report for Application No. EP16871047.3 dated Nov. 15, 2018.
Kiebele, A. et al., "Carbon nanotube based battery architecture", Applied Physics Letters, Oct. 3, 2007, vol. 91, No. 14, pp. 144104-2, XP012099613.
Chinese Search Report for Application No. 201680052380.0 dated Jun. 19, 2020, 1 page.

* cited by examiner

POSITIVE ELECTRODE FOR SECONDARY BATTERY AND SECONDARY BATTERY INCLUDING THE SAME

CROSS-REFERENCE TO RELATED APPLICATIONS

The present application is a national phase entry under 35 U.S.C. § 371 of International Application No. PCT/KR2016/014002 filed Nov. 30, 2016, the disclosure of which is incorporated herein in its entirety by reference, which claims priority to Korean Patent Application Nos. 10-2015-0169150, filed on Nov. 30, 2015, and 10-2016- 0161525, filed on Nov. 30, 2016, in the Korean Intellectual Property Office, the disclosures of which are incorporated herein in their entirety by reference.

TECHNICAL FIELD

The present invention relates to a positive electrode for a secondary battery, which may improve output characteristics of the battery by reducing charge transfer resistance through the formation of an electrical network across the entire positive electrode, and a secondary battery including the same.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

A lithium secondary battery includes a non-aqueous electrolyte containing lithium ions in an electrode assembly in which a microporous separator is disposed between a positive electrode including a positive electrode active material capable of intercalating and deintercalating the lithium ions and a negative electrode including a negative electrode active material capable of intercalating and deintercalating the lithium ions. Also, a material having conductivity in itself, such as a lithium metal, an alloy with the lithium metal, and a carbon-based material, is being used as the negative electrode active material of the lithium secondary battery, and a transition metal oxide, such as lithium cobalt oxide ($LiCoO_2$), lithium manganese oxide ($LiMn_2O_4$), or lithium nickel oxide ($LiNiO_2$), and a composite oxide, in which some of these transition metals are substituted by other transition metals, are mainly being used as the positive electrode active material.

With respect to the positive electrode active material, since its own electrical conductivity is low, a conductive agent having high electrical conductivity must be included during the preparation of the positive electrode.

In a lithium secondary battery, a positive electrode is prepared by coating a positive electrode collector with a positive electrode active material composition, which is prepared by collectively mixing a positive electrode active material, a conductive agent, and, selectively, a binder in a solvent as a dispersant, and then drying the coated positive electrode collector.

However, since the positive electrode active material and the conductive agent are typically used in the form of powder, miscibility with the solvent is low when the positive electrode active material and the conductive agent are collectively added to the solvent and mixed, and thus, the positive electrode active material and the conductive agent may be non-uniformly dispersed in the positive electrode active material composition. In a case in which a positive electrode active material layer is formed by coating the positive electrode collector with the positive electrode active material composition in which components, such as the positive electrode active material and the conductive agent, are non-uniformly dispersed as described above, uniform coating on the positive electrode collector is difficult, and, as a result, a positive electrode active material layer having low thickness uniformity or surface defects is formed to degrade battery performance and lifetime characteristics.

Also, since the conductive agent is used as fine particles of a few tens of nanometers (nm), cohesion is strong, and thus, agglomeration of the fine conductive agent particles may easily occur when the conductive agent particles are dispersed in the solvent. Accordingly, if the non-uniform dispersion of the conductive agent in the composition occurs, an effect of improving conductivity in the positive electrode active material layer is insufficient, and thus, output characteristics of the battery may be degraded.

Furthermore, in a case in which the electrode is prepared by using the conductive agent, since a solid content in a positive electrode material mixture is higher than that of a case in which the conductive agent is not used, migration of the binder in the electrode may occur. Thus, non-uniformity in adhesive strength of the positive electrode active material layer with respect to the positive electrode collector may occur due to the migration of the binder during the preparation of the positive electrode, and, as a result, the positive electrode active material layer may be separated from the positive electrode collector and exfoliated. In this case, the exfoliation may not only significantly degrade the battery performance itself, but also may be a cause of reducing the lifetime characteristics of the battery.

Recently, in line with the increase in demand for high-power secondary batteries, research into a method of increasing energy density of the battery by reducing an amount of the conductive agent, while maintaining or improving electrical conductivity in the electrode at the same time, has been conducted to increase the output characteristics of the battery. However, since the method of simply reducing the amount of the conductive agent may significantly decrease the probability of contact between the conductive agent and the positive electrode active material present on the surface of the positive electrode, the output characteristics may rather be degraded.

PRIOR ART DOCUMENT

Korean Patent Application Laid-open Publication No. 2005-0052266

DISCLOSURE OF THE INVENTION

Technical Problem

An aspect of the present invention provides a positive electrode for a secondary battery in which output characteristics of the battery are improved by reducing charge transfer resistance through an electrical network across the entire positive electrode and reducing material resistance through the control of porosity in the positive electrode.

Another aspect of the present invention provides a method of preparing the positive electrode for a secondary battery.

Another aspect of the present invention provides a lithium secondary battery, a battery module, and a battery pack which include the positive electrode for a secondary battery.

Technical Solution

According to an aspect of the present invention, there is provided a positive electrode for a secondary battery including:

a positive electrode collector;

a porous positive electrode active material layer disposed on a surface of the positive electrode collector and including a positive electrode active material and first carbon nanotubes; and a conductive layer disposed on a surface of the positive electrode active material layer, wherein the conductive layer includes a porous network structure formed by a plurality of second carbon nanotubes and has a porosity equal to or greater than a porosity of the positive electrode active material layer +10 vol %.

Specifically, the porosity of the porous positive electrode active material layer may be in a range of 10 vol % to 50 vol %, and the porosity of the conductive layer may be in a range of 20 vol % to 60 vol %.

According to another aspect of the present invention, there is provided a method of preparing the above-described positive electrode for a secondary battery including:

adding second carbon nanotubes in a dispersion medium to prepare a composition for forming a conductive layer in which a second carbon nanotube layer is formed on a surface of the dispersion medium; and after impregnating an electrode assembly, in which a positive electrode active material layer including a positive electrode active material and first carbon nanotubes is formed on at least one side of a positive electrode collector, in the composition for forming a conductive layer, forming a conductive layer by lifting the electrode assembly so that the second carbon nanotube layer is disposed on a surface of the positive electrode active material layer.

According to another aspect of the present invention, there is provided a lithium secondary battery, a battery module, and a battery pack which include the above-described positive electrode.

Details of other embodiments of the present invention are included in the following detailed description.

Advantageous Effects

A positive electrode for a secondary battery according to the present invention may significantly reduce charge transfer resistance, while keeping material resistance in an active material layer low, by forming an electrical network across the surface and inside of the positive electrode active material layer using carbon nanotubes having excellent strength characteristics as well as excellent electrical conductivity, and, as a result, the positive electrode for a secondary battery according to the present invention may significantly improve output characteristics of the battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

Figure 1A:
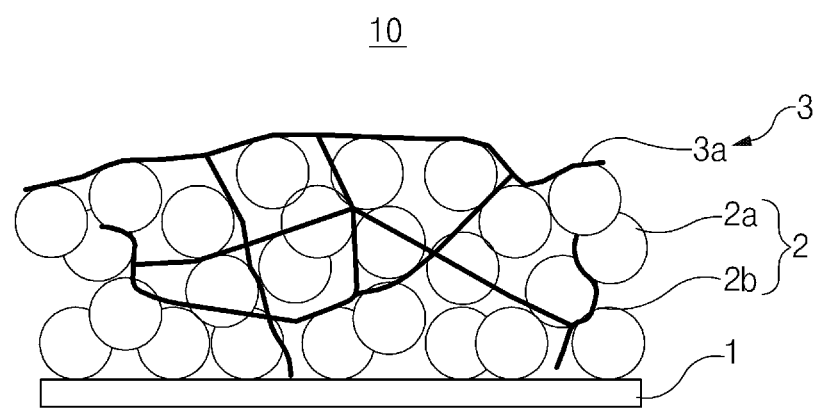
FIG. 1A is a schematic view illustrating a cross-sectional structure of a positive electrode according to an embodiment of the present invention.

DESCRIPTION OF THE SYMBOLS 1, 11: Positive electrode collector
2, 12: Positive electrode active material layer
2a, 12a: Positive electrode active material
2b: First carbon nanotubes
12b: Carbon nanotubes
3: Conductive layer
3a: Second carbon nanotubes
10, 100: Positive electrode

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode for a secondary battery according to an embodiment of the present invention includes:

a positive electrode collector, a porous positive electrode active material layer disposed on a surface of the positive electrode collector and including a positive electrode active material and first carbon nanotubes, and a conductive layer disposed on a surface of the positive electrode active material layer, wherein the conductive layer includes a porous network structure formed by a plurality of second carbon nanotubes and has a porosity equal to or greater than a porosity of the positive electrode active material layer +10 vol %.

Specifically, the porosity of the porous positive electrode active material layer may be in a range of 10 vol % to 50 vol %, and the conductive layer may have a porosity of 20 vol % to 60 vol %.

Thus, the positive electrode for a secondary battery according to the embodiment of the present invention may significantly reduce charge transfer resistance in the active material layer by forming an electrical network by the first and second carbon nanotubes across the surface and inside of the positive electrode active material layer, and, furthermore, may suppress an increase in material resistance in the positive electrode active material layer through the control of the porosity in the positive electrode active material layer and the porosity in the conductive layer. As a result, the positive electrode for a secondary battery according to the embodiment of the present invention may significantly improve output characteristics of the battery.

In the present invention, the porosity in the positive electrode active material layer or the conductive layer may be converted into a volume based on true density of a sample having an area of 25 cm$^2$, which is measured using a pycnometer, and may be controlled by rolling the electrode to a thickness corresponding to desired porosity. Accordingly, for example, the porosity of the positive electrode active material layer may be determined according to Equation 1 below.

$$\text{Porosity of positiv electrode active material layer (\%)} = \frac{\left\{\left(\dfrac{\text{weight of sample}}{\text{true density of sample}}\right) - \left(\dfrac{\text{weight of current collector}}{\text{true density of current collector}}\right)\right\}}{\text{sample volume}} \quad [\text{Equation 1}]$$

wherein, the sample volume is 25 cm$^2$×a thickness of the positive electrode active material layer.

Thus, with respect to the porosity of the conductive layer, porosities of a sample including the conductive layer and a sample without the conductive layer are measured in the same manner using Equation 1, a difference between a pore volume of the sample including the conductive layer and a pore volume of the sample without the conductive layer is calculated, and pore volume and porosity of the conductive layer may be obtained by Equation 2 below.

$$\text{Porosity of conductive layer (\%)} = \frac{\begin{bmatrix}\text{pore volume of sample including}\\ \text{conductive layer} -\\ \text{pore volume of sample}\\ \text{without conductive layer}\end{bmatrix}}{\text{conductive layer volume}} \quad [\text{Equation 2}]$$

wherein, the conductive layer volume is 25 cm$^2$×a thickness of the conductive layer.

Figure 1B:
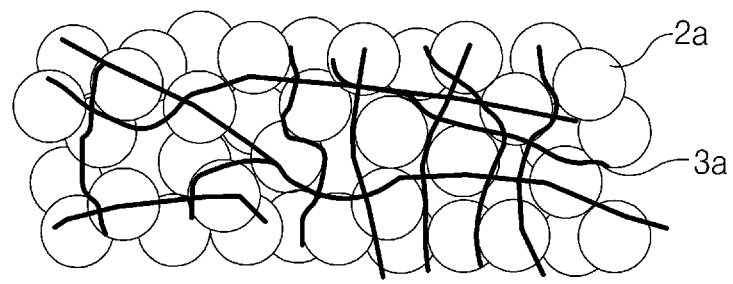
FIG. 1B is a plan view schematically illustrating a surface of the positive electrode.

FIG. 1A is a schematic view illustrating a cross-sectional structure of the positive electrode according to the embodiment of the present invention, and FIG. 1B is a plan view schematically illustrating a surface of the positive electrode. FIGS. 1A and 1B are only examples for describing the present invention, and the present invention is not limited thereto. Hereinafter, the positive electrode according to the embodiment of the present invention will be described with reference to FIGS. 1A and 1B.

A positive electrode 10 for a secondary battery according to the embodiment of the present invention includes a positive electrode collector 1, a porous positive electrode active material layer 2 disposed on a surface of the positive electrode collector, and a conductive layer 3 disposed on a surface of the positive electrode active material layer.

In the positive electrode 10 for a secondary battery according to the embodiment of the present invention, the positive electrode collector 1 is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, or silver may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as a film, a sheet, a foil, a net, a porous body, a foam body, a non-woven fabric body, and the like.

Also, in the positive electrode 10 for a secondary battery according to the embodiment of the present invention, the positive electrode active material layer 2 is disposed on at least one surface of the positive electrode collector 1 and includes a positive electrode active material 2a and first carbon nanotubes 2b as a conductive agent.

The positive electrode active material, as a compound (lithiated intercalation compound) capable of reversibly intercalating and deintercalating lithium, may specifically include a lithium composite metal oxide including lithium and at least one metal such as cobalt, manganese, nickel, or aluminum.

Specifically, the lithium composite metal oxide may include lithium-manganese-based oxide (e.g., LiMnO$_2$, LiMn$_2$O$_4$, etc.), lithium-cobalt-based oxide (e.g., LiCoO$_2$, etc.), lithium-nickel-based oxide (e.g., LiNiO$_2$, etc.), lithium-nickel-manganese-based oxide (e.g., LiNi$_{1-Y1}$Mn$_{Y1}$O$_2$ (where 0<Y1<1), LiMn$_{2-Z1}$Ni$_{Z1}$O$_4$ (where 0<Z1<2), etc.), lithium-nickel-cobalt-based oxide (e.g., LiNi$_{1-Y2}$Co$_{Y2}$O$_2$ (where 0<Y2<1), etc), lithium-manganese-cobalt-based oxide (e.g., LiCo$_{1-Y3}$Mn$_{Y3}$O$_2$ (where 0<Y3<1), LiMn$_{2-Z2}$Co$_{Z2}$O$_4$ (where 0<Z2<2), etc.), lithium-nickel-manganese-cobalt-based oxide (e.g., Li(Ni$_p$Co$_q$Mn$_{r1}$)O$_2$ (where 0<p<1, 0<q<1, 0<r1<1, and p+q+r1=1) or Li(Ni$_{p1}$Co$_{q1}$Mn$_{r2}$)O$_4$ (where 0<p1<2, 0<q1<2, 0<r2<2, and p1+q1+r2=2), etc.), or lithium-nickel-cobalt-transition metal (M) oxide (e.g., Li(Ni$_{p2}$Co$_{q2}$Mn$_{r3}$M$_{s2}$)O$_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<s2<1, and p2+q2+r3+s2=1), etc.), and any one thereof or a compound of two or more thereof may be included. Among these materials, in terms of the improvement of the capacity characteristics and stability of the battery, the lithium composite metal oxide may include LiCoO$_2$, LiMnO$_2$, LiNiO$_2$ lithium nickel manganese cobalt oxide (e.g., Li(Ni$_{0.6}$Mn$_{0.2}$CO$_{0.2}$) O$_2$, Li(Ni$_{0.5}$Mn$_{0.3}$CO$_{0.2}$) O$_2$, Li(Ni$_{0.7}$Mn$_{0.15}$Co$_{0.15}$)O$_2$, or Li(Ni$_{0.8}$Mn$_{0.1}$CO$_{0.1}$) O$_2$) or lithium nickel cobalt aluminum oxide (e.g., Li(Ni$_{0.8}$Co$_{0.15}$Al$_{0.05}$)O$_2$, etc.). In consideration of a significant improvement due to the control of type and content ratio of elements constituting the lithium composite metal oxide, the lithium composite metal oxide may include Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.7}$Mn$_{0.15}$Co$_{0.15}$)O$_2$, or Li(Ni$_{0.8}$Mn$_{0.1}$Co$_{0.1}$)O$_2$, and any one thereof or a mixture of two or more thereof may be used.

Also, in the lithium composite metal oxide, at least one of metallic elements excluding lithium may be doped with at least one element selected from the group consisting of tungsten (W), Mo, zirconium (Zr), Ti, Mg, Ta, Al, Fe, V, Cr, barium (Ba), calcium (Ca), and niobium (Nb). Thus, in a case in which the lithium composite metal oxide is further doped with the above-described metallic element, structural stability of the positive electrode active material is improved, and, as a result, the output characteristics of the battery may be improved. In this case, an amount of the doping element included in the lithium composite metal oxide may be appropriately adjusted within a range that does not deteriorate characteristics of the positive electrode active material and may specifically be 0.02 at % or less.

Specifically, in the positive electrode active material according to an embodiment of the present invention, the lithium composite metal oxide may include a compound of the following Formula 1.

$$Li_aNi_{1-x-y}Co_xM1_yM2_zO_2 \quad \text{[Formula 1]}$$

(in Formula 1, M1 includes at least one element selected from the group consisting of aluminum (Al) and manganese (Mn), and M2 includes at least one element selected from the group consisting of W, Mo, Zr, Ti, Mg, Ta, Al, Fe, V, Cr, Ba, Ca, and Nb, wherein $1.0 \le a \le 1.5$, $0 < x \le 0.5$, $0 < y \le 0.5$, $0 < z \le 0.02$, and $0 < x+y \le 0.7$, for example, $1.0 \le a \le 1.2$, $0 < x \le 0.5$, $0 < y \le 0.5$, $0.0005 \le z \le 0.02$, and $0 < x+y \le 0.7$.)

Also, the positive electrode active material may have an average particle diameter ($D_{50}$) of 3 μm to 20 μm in consideration of a specific surface area and positive electrode material mixture density. In a case in which the average particle diameter of the positive electrode active material is less than 3 μm, dispersibility in a positive electrode material mixture may be reduced due to the agglomeration of the positive electrode active material, and, in a case in which the average particle diameter is greater than 20 μm, mechanical strength and specific surface area of the positive electrode active material may be reduced. Furthermore, in consideration of a significant effect of improvement in rate capability and initial capacity characteristics of the battery due to its unique structure, the positive electrode active material may have an average particle diameter ($D_{50}$) of 3 μm to 15 μm. In the present invention, the average particle diameter ($D_{50}$) of the positive electrode active material may be defined as a particle diameter at 50% in a cumulative particle diameter distribution. In the present invention, the average particle diameter ($D_{50}$) of the positive electrode active material, for example, may be measured by a laser diffraction method. For example, in the measurement method of the average particle diameter ($D_{50}$) of the positive electrode active material, particles of the positive electrode active material are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

The positive electrode active material 2a may be included in an amount of 80 wt % to 99 wt % based on a total weight of the positive electrode active material layer 2. If the amount of the positive electrode active material is less than 80 wt %, capacity characteristics of the battery may be degraded, and, in a case in which the amount of the positive electrode active material is greater than 99 wt %, the probability of contact between the positive electrode active material and the conductive agent may be reduced due to a relative decrease in an amount of the conductive agent and the output characteristics of the battery may be degraded due to the resulting increase in electrically inactive material.

Furthermore, the first carbon nanotubes 2b, as a secondary structure formed by aggregation of a plurality of carbon nanotube units, may be a bundle type in which the plurality of carbon nanotube units has a bundle or rope shape in which axes in longitudinal directions of the units are arranged side by side in substantially the same orientation, or may have an entangled shape in which the carbon nanotube units are entangled. Among these, the first carbon nanotubes may be the bundle type in consideration of excellent dispersibility.

Typically, physical properties of carbon nanotubes may vary depending on crystallinity, structure, and shape of units constituting the carbon nanotubes, structure and shape of a secondary particle composed of the units, and an amount of a metallic element included in the carbon nanotubes. Accordingly, carbon nanotubes may be allowed to have physical properties, which are required according to the application of the carbon nanotubes, by controlling at least one of the above-described factors in combination. Specifically, carbon nanotubes may exhibit low resistance as the crystallinity is high, defects are low, and a thickness of walls of the carbon nanotubes is small during the growth thereof. Also, when the carbon nanotubes are used in an electrode, resistance in the electrode may be reduced as the resistance of the carbon nanotube itself is low, and, as a result, battery performance may be improved.

The first carbon nanotubes used in the present invention may include at least one of single-walled, double-walled, and multi-walled carbon nanotube units.

Also, the first carbon nanotubes may have a diameter of the unit of 10 nm to 100 nm and a length of the unit of 3 μm to 10 μm. When the first carbon nanotube unit satisfies the above-described diameter and length conditions, an electrically conductive network may be easily formed without worrying about non-uniform dispersion in the positive electrode material mixture.

Furthermore, along with the above-described diameter and length conditions of the unit, the first carbon nanotube, as a secondary particle, may have a specific surface area of 20 m$^2$/g to 2,000 m$^2$/g. If the specific surface area of the first carbon nanotube is less than 20 m$^2$/g, an improvement effect may be insignificant due to a decrease in reaction area, and, if the specific surface area of the first carbon nanotube is greater than 2,000 m$^2$/g, the formation of the conductive network may be difficult. Specifically, in consideration of a significant improvement effect due to the control of the specific surface area of the first carbon nanotube, the specific surface area of the first carbon nanotube may be in a range of 100 m$^2$/g to 400 m$^2$/g.

In the present invention, the specific surface area of the carbon nanotube is measured by a Brunauer-Emmett-Teller (BET) method, wherein, specifically, the specific surface area may be calculated from a nitrogen gas adsorption amount at a liquid nitrogen temperature (77K) using BEL-SORP-mini II by Bell Japan Inc.

Also, the first carbon nanotube may have a bulk density of 0.01 kg/m³ to 200 kg/m³, particularly 0.01 kg/m³ to 10 kg/m³, and more particularly 0.01 kg/m³ to 1 kg/m³. Carbon nanotubes may exhibit excellent dispersibility as the bulk density is low, but, in a case in which the bulk density is excessively low, the amount of the carbon nanotube unit in the electrode may be decreased to reduce electrical conductivity in the electrode. The first carbon nanotubes used in the present invention may exhibit excellent electrical conductivity by having the bulk density within the above-described range. In the present invention, the bulk density of the carbon nanotube may be determined according to the following Equation 3.

$$\text{Bulk density (kg/m}^3\text{)=carbon nanotube weight (kg)/ carbon nanotube volume (m}^3\text{)} \quad \text{[Equation 3]}$$

The first carbon nanotubes as described above may be commercially obtained and used, or may be directly prepared and used. In a case in which the first carbon nanotubes are prepared, the first carbon nanotubes may be prepared by using a conventional method such as an arc-discharge method, a laser ablation method, or a chemical vapor deposition method, and the above-described physical properties may be achieved by controlling a type of catalyst, a heat treatment temperature, and an impurity removal method during a preparation process.

The first carbon nanotubes may be included in an amount of 0.2 wt % to 2 wt % based on the total weight of the positive electrode active material layer. In a case in which the amount of the first carbon nanotubes is less than 0.2 wt %, there is a concern that the output characteristics may be degraded due to a decrease in conductivity and an increase in resistance in the positive electrode, and, in a case in which the amount of the first carbon nanotubes is greater than 2 wt %, since the dispersion of the carbon nanotubes is difficult and the carbon nanotubes block pores in the electrode, there is a concern that the output characteristics may be degraded due to an increase in lithium (Li) ion transfer resistance in an electrolyte solution.

Also, the positive electrode active material layer 2 may further include a heterogeneous conductive agent (not shown) having different shapes, such as particulate, fibrous, or a plate shape, with the above-described first carbon nanotubes, and, specifically, the heterogeneous conductive agent may be included in an amount of 0.2 wt % to 6 wt % based on the total weight of the positive electrode active material layer. As describe above, in a case in which the conductive agent having shape anisotropy is additionally used, the formation of a three-phase interface with the positive electrode active material and an electrolyte is facilitated to increase reactivity, and excellent pore characteristics may be provided by allowing pores between positive electrode active material particles to be maintained while securing conductivity between the positive electrode active material particles.

In a case in which the additionally included conductive agent is a particulate conductive agent, the particulate conductive agent may specifically have an average particle diameter ($D_{50}$) of 10 nm to 150 nm and a specific surface area of 20 m²/g to 600 m²/g Since the particulate conductive agent has a small particle diameter and a large specific surface area which satisfy the above-described ranges, electron supply at the three-phase interface with the positive electrode active material and the electrolyte may be increased to improve the reactivity. If the average particle diameter of the particulate conductive agent is less than 10 nm or the specific surface area is greater than 170 m²/g, the dispersibility in the positive electrode material mixture may be significantly reduced due to the agglomeration of conductive agent particles and, if the average particle diameter is greater than 45 nm or the specific surface area is less than 40 m²/g, since the diameter is excessively large, the conductive agent may not be uniformly dispersed over the entire positive electrode material mixture, but may be partially concentrated in the arrangement of the conductive agent according to porosity of the positive electrode active material. The average particle diameter of the particulate conductive agent may be measured in the same manner as in the positive electrode active material.

The particulate conductive agent may be used without particular limitation as long as it satisfies a morphological condition while having conductivity, but the conductive agent may be a non-graphite-based carbon material in consideration of the excellent improvement effect due to the use of the particulate conductive agent. Specifically, the particulate conductive agent may include carbon black, acetylene black, Ketjen black, channel black, furnace black, lamp black, thermal black, or Denka black, and any one thereof or a mixture of two or more thereof may be used.

Furthermore, in the conductive agent, the plate-shaped conductive agent, as a conductive agent having an aggregate structure in which two sides corresponding or opposite to each other are flat and a size in a horizontal direction is larger than a size in a vertical direction, may have a shape similar to a plate shape, such as a flake shape and a scaly shape, as well as a complete plate shape. Specifically, the plate-shaped conductive agent may have a ratio of a diameter of the flat side to a thickness of the plate-shaped conductive agent (=diameter/thickness) of 2 to 400. When the plate-shaped conductive agent having the above-described size range is mixed and used with the above-described particulate and fibrous conductive agents, the conductive network may be easily formed in the positive electrode material mixture and the pore characteristics may be well maintained. Specifically, in consideration of the significant effect due to the mixed use of the plate-shaped conductive agent and the control of its particle size, the plate-shaped conductive agent may have a ratio of the diameter of the flat side to the thickness of 10 to 200. In the present invention, the expression "diameter" of the plate-shaped conductive agent denotes the longest length among lengths of lines connecting two points in a closed curve formed by a circumference of a flat side. In this case, the expression "closed curve" denotes a curve in which a point on the curve moves in one direction and returns to a starting point again. Also, the expression "thickness' of the plate-shaped conductive agent denotes an average length between the two flat sides.

Also, the positive electrode active material layer 2 may further include a binder (not shown) to improve the adhesion between the positive electrode active material particles and the adhesion between the positive electrode active material and the positive electrode collector, if necessary.

Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 10 wt % based on the total weight of the positive electrode active material layer.

The positive electrode active material layer 2 having the above-described configuration includes a plurality of pores between the particles of the positive electrode active material 2a and between the positive electrode active material 2a and the first carbon nanotubes 2b, and thus, the positive electrode active material layer 2 has porosity. Since the pores formed in the positive electrode active material layer become moving paths of materials such as the electrolyte, the pores may reduce mass transfer resistance in the positive electrode active material layer.

Specifically, the positive electrode active material layer 2 may have a porosity of 10 vol % to 50 vol %, for example, 20 vol % to 45 vol % through the control of physical properties and amounts of components constituting the positive electrode active material layer.

Also, in the positive electrode 10 for a secondary battery according to the embodiment of the present invention, the conductive layer 3 is disposed on the surface of the positive electrode active material layer 2 and includes a porous network structure in which a plurality of second carbon nanotubes 3a are entangled and three-dimensionally connected (see FIGS. 1A and 1B). In this case, the second carbon nanotubes 3a are the same as described for the first carbon nanotubes included in the positive electrode active material layer, and may be the same or different from the first carbon nanotubes. Specifically, in consideration of a functional difference according to a position in the positive electrode, the second carbon nanotube may have a smaller diameter and a longer length than the first carbon nanotube.

Figure 2A:
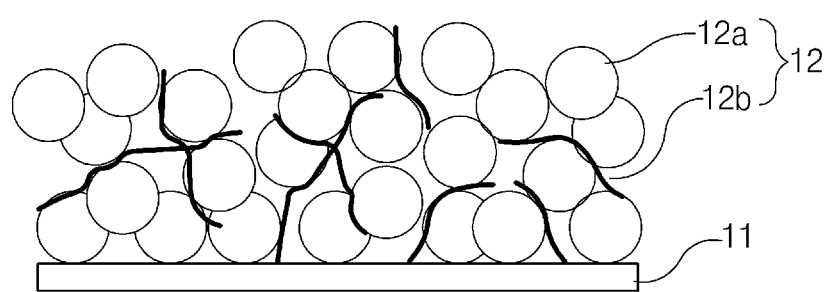
FIG. 2A is a schematic view illustrating a cross-sectional structure of a positive electrode which is prepared by using a conventional fibrous conductive agent.
Figure 2B:
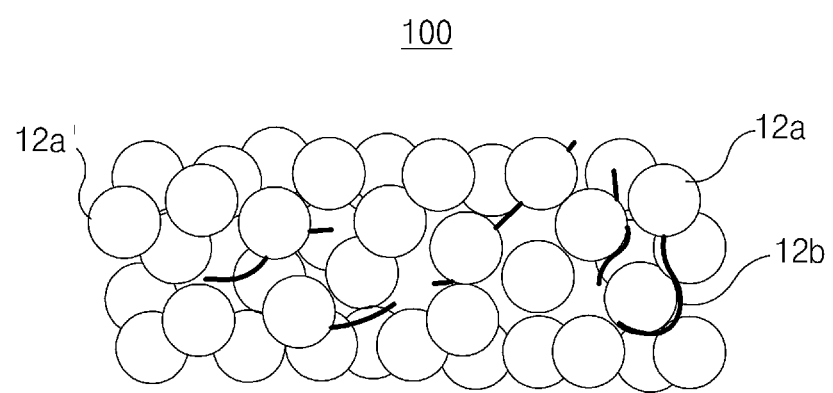
FIG. 2B is a plan view schematically illustrating a surface of the conventional positive electrode.

FIG. 2A is a schematic view illustrating a cross-sectional structure of a positive electrode which is prepared by using conventional carbon nanotubes, and FIG. 2B is a plan view schematically illustrating a surface of the positive electrode. As illustrated in FIGS. 2A and 2B, with respect to a conventional positive electrode 100, since carbon nanotubes 12b are distributed in a positive electrode active material layer 12, electrical conductivity may be maintained over a contact area of a positive electrode collector 11, but an electrically inactive positive electrode active material 12a may be present because the probability of contact with the carbon nanotubes 12b is gradually reduced toward a surface of the positive electrode active material layer 12. The electrically inactive positive electrode active material 12a is a cause of reducing battery capacity. In order to address this limitation, in a case in which a conductive layer is additionally formed on the surface of the positive electrode active material layer by coating with a conductive layer slurry (not shown), since it is not only difficult to form a conductive layer having a small thickness, i.e., a thickness ratio of the conductive layer to the positive electrode active material of 0.02 or less, but the surface of the positive electrode active material layer is also entirely covered with the conductive layer, the movement of Li ions in the electrolyte solution to the electrode is not smooth, and thus, the rate capability may be reduced.

Figure 4:
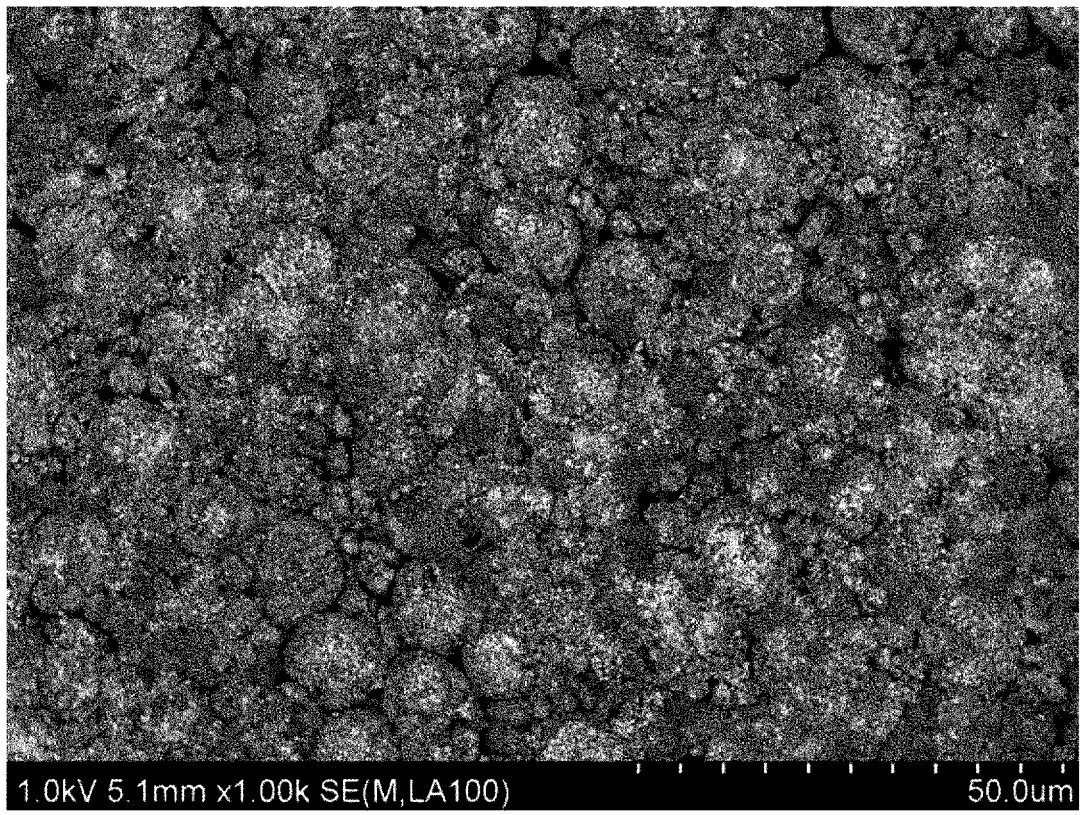
FIG. 4 is a scanning electron microscope (SEM) image of the surface of the positive electrode according to the embodiment of the present invention.

In contrast, as illustrated in FIGS. 1A and 1B, in the positive electrode 10 according to the embodiment of the present invention, since the conductive layer 3 including the porous network structure composed of the second carbon nanotubes 3a is disposed on the surface of the positive electrode active material layer 2 (see FIG. 4), the generation of the inactive positive electrode active material is prevented through the contact with the positive electrode active material 2a present on the surface of the positive electrode active material layer and, simultaneously, the conductive layer is connected to the first carbon nanotubes 2b present in the positive electrode active material layer to form an electrically conductive path. Thus, electron transfer resistance in the positive electrode active material layer may be reduced.

The above-described conductive layer 3 including the porous network structure may be formed to have a thickness ratio of 1:001 to 1:0.05 with respect to a thickness of the positive electrode active material layer 2. If the thickness ratio is less than 0.001, there is a concern that a carbon nanotube network may not be sufficiently formed on the positive electrode active material layer, and, if the thickness ratio is greater than 0.05, there is a concern that pores in the carbon nanotube network formed may be clogged. Specifically, the thickness ratio of the conductive layer 3: the positive electrode active material layer 2 may be in a range of 0.001:1 to 0.01:1, for example, 0.001:1 to 0.005:1. In this case, different from the related art, since the conductive layer is formed as a network structure on the surface of the positive electrode active material layer even in a case in which the conductive layer is formed to have a thickness ratio of 1:0.02 to 1:0.05 with respect to the thickness of the positive electrode active material layer, the Li ions in the electrolyte solution may smoothly move to the electrode, and thus, the rate capability may be further improved than the related art.

Also, an amount of the second carbon nanotubes 3a included in the conductive layer 3 may be determined in consideration of an amount of the total carbon nanotubes included in the finally prepared positive electrode, and, specifically, the second carbon nanotubes may be included such that the amount of the second carbon nanotubes is not greater than 4 times the amount of the total carbon nanotubes in the positive electrode. In a case in which the amount of the second carbon nanotubes is greater than 4 times the amount of the total carbon nanotubes in the positive electrode, since the transfer of the electrolyte solution into the active material layer is disturbed due to an increase in the thickness of the conductive layer, the resistance may be increased.

In this case, the first carbon nanotubes and the second carbon nanotubes may be included in a weight ratio of 1:0.08 to 1:0.42.

If the weight ratio of the second carbon nanotubes to the first carbon nanotubes is less than 0.08, the carbon nanotube network may not be sufficiently formed on the positive electrode active material layer, and, if the weight ratio is greater than 0.42, porosity in the three-dimensional network structure formed by the second carbon nanotubes may be decreased to reduce mass transfer effect.

Furthermore, the porous network structure of the second carbon nanotubes 3a includes pores between the second carbon nanotubes in the structure. Pore size and porosity in the porous network structure may be controlled by controlling the diameter and amount of the second carbon nanotubes, wherein, specifically, the conductive layer 3 including the porous network structure has a higher porosity than the porosity in the positive electrode active material layer 2. Thus, the conductive layer 3 may prevent an increase in the mass transfer resistance by having higher porosity. Specifically, the porosity of the conductive layer 3 may be equal to or greater than the porosity in the positive electrode active material layer 2+10%. More specifically, the conductive layer 3 may have a porosity of 20 vol % to 60 vol %, for example, 30 vol % to 60 vol %.

Specifically, in order to further improve the output characteristics of the battery by reducing the charge transfer resistance through sufficient formation of the electrical network across the entire positive electrode and reducing the material resistance through the control of porosity between the positive electrode active material layer and the conductive layer, in the positive electrode for a secondary battery according to the embodiment of the present invention, the positive electrode active material layer may have a porosity of 10 vol % to 50 vol % based on a total volume of the positive electrode active material layer, the thickness of the conductive layer may be in a ratio of 0.001:1 to 0.05:1 with respect to a total thickness of the positive electrode active material layer, and the porosity of the conductive layer may be 10 vol % or more higher than the porosity of the positive electrode active material layer. More specifically, in the positive electrode for a secondary battery according to the embodiment of the present invention, the positive electrode active material layer may have a porosity of 10 vol % to 50 vol % based on the total volume of the positive electrode active material layer, the thickness of the conductive layer may be in a ratio of 0.001:1 to 0.01:1 with respect to the total thickness of the positive electrode active material layer, and the porosity of the conductive layer may be in a range of 20 vol % to 60 vol % or more.

The positive electrode for a secondary battery having the above-described structure according to the embodiment of the present invention may be prepared by a preparation method including the steps of:

adding second carbon nanotubes in a dispersion medium to prepare a composition for forming a conductive layer in which a second carbon nanotube layer is formed on a surface of the dispersion medium (step 1); and after impregnating an electrode assembly, in which a positive electrode active material layer including a positive electrode active material and first carbon nanotubes is formed on at least one side of a positive electrode collector, in the composition for forming a conductive layer, forming a conductive layer by lifting the electrode assembly so that the second carbon nanotube layer is disposed on a surface of the positive electrode active material layer (step 2).

Thus, according to another embodiment of the present invention, provided is a method of preparing the positive electrode for a secondary battery.

Figure 3:
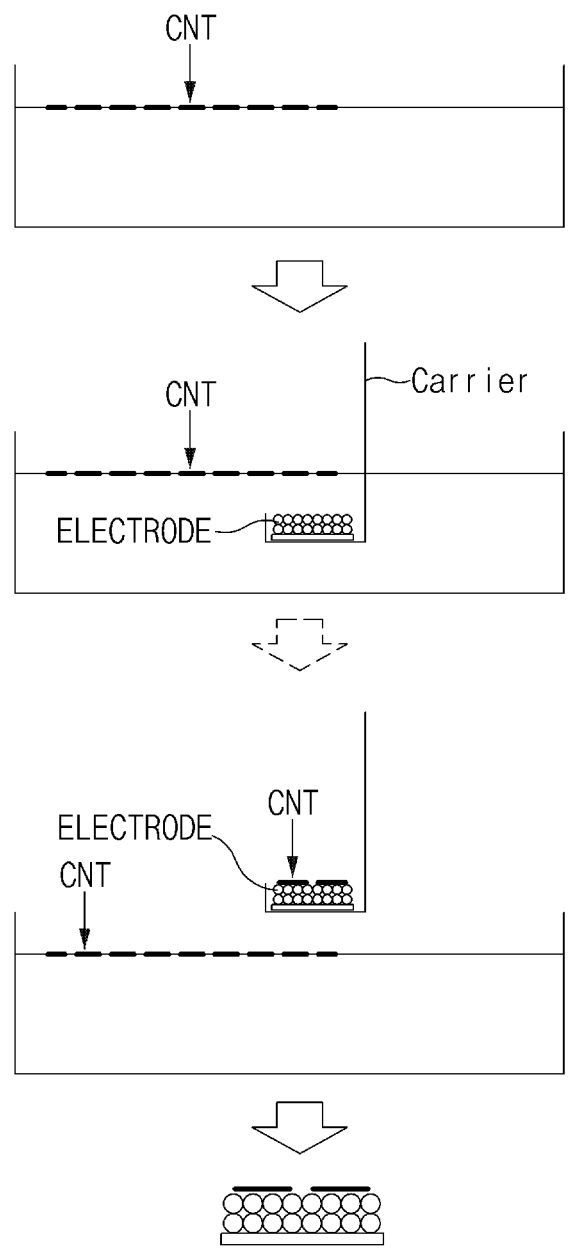
FIG. 3 is a flowchart schematically illustrating a process of preparing the positive electrode according to the embodiment of the present invention.

FIG. 3 is a process diagram schematically illustrating the method of preparing the positive electrode for a secondary battery according to the embodiment of the present invention. FIG. 3 is only an example for describing the present invention, and the present invention is not limited thereto. Hereinafter, each step will be described with reference to FIG. 3.

First, step 1 for the preparation of the positive electrode for a secondary battery is a step of preparing a composition for forming a conductive layer (S1).

The composition for forming a conductive layer may be prepared by adding carbon nanotubes in a dispersion medium, wherein, specifically, in order to allow the carbon nanotubes not to be mixed in the dispersion medium, but to allow the carbon nanotubes to form a three-dimensional porous network structure layer on a surface of the dispersion medium, the second carbon nanotubes are dropped on the dispersion medium little by little, and the composition for forming a conductive layer may then be prepared by dispersing the second carbon nanotubes on the dispersion medium through a sonication treatment.

In this case, the second carbon nanotubes may be the same as the first carbon nanotubes previously described, and an amount of the second carbon nanotubes added may be appropriately determined in consideration of the thickness of the finally prepared conductive layer and the total amount of the carbon nanotubes in the positive electrode active material.

Also, the dispersion medium may include an amide-based polar organic solvent such as dimethylformamide (DMF), diethylformamide, dimethylacetamide (DMAc), and N-methylpyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 2-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones such as acetone, methyl ethyl ketone, methyl propyl ketone, or cyclopentanone; and esters such as ethyl acetate, γ-butyrolactone, and ε-propiolactone, and any one thereof or a mixture of two or more thereof may be used. Among them, a dispersion medium having an appropriate difference in polarity may be selected in consideration of spreadability during the formation of the carbon nanotube layer, and, for example, an alcoholic solvent may be used.

Next, step 2 is a step of forming a conductive layer on a positive electrode active material layer by using the composition for forming a conductive layer which is prepared in step 1 (S2).

Specifically, after a positive electrode assembly is prepared by forming the positive electrode active material layer on a positive electrode collector, the positive electrode assembly is impregnated in the composition for forming a conductive layer which is prepared in step 1, and the conductive layer may then be formed by slowly lifting the positive electrode assembly so that the carbon nanotube layer is disposed on the active material layer of the positive electrode assembly.

A composition for forming a positive electrode active material layer is prepared by mixing the positive electrode active material, the carbon nanotubes, and selectively, a binder in a solvent, and the positive electrode assembly may be prepared by coating at least one side of the positive electrode collector with the composition and drying the coated collector, or the positive electrode assembly may be prepared by casting the composition for forming a positive electrode active material layer on a separate support and then laminating a film separated from the support on the positive electrode collector. In this case, types and amounts of the positive electrode assembly, the positive electrode active material, the carbon nanotubes, and the binder are the same as those previously described.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the electrode active material and the binder in consideration of a coating thickness of the composition and manufacturing yield, and may allow to have a viscosity that may provide excellent thickness uniformity during the subsequent coating for the preparation of the electrode.

After impregnating the positive electrode assembly prepared by the above-described method in the composition for forming a conductive layer which is prepared in step 1, the second carbon nanotube layer disposed on the surface of the composition for forming a conductive layer is lifted up above the positive electrode active material layer. The thin carbon nanotube layer floating on the surface of the composition for forming a conductive layer may be directly formed on the positive electrode active material layer through the above-described process.

In this case, impregnation time may be in a range of about 10 seconds to about 60 seconds, and, in a case in which the impregnation time is greater than 60 seconds, the binder in the positive electrode active material may be deformed to cause a structural change. Also, the positive electrode active material layer may be slowly lifted at a rate of about 0.13 m/min to about 0.16 m/min, for example, 0.15 m/min.

In this case, in order to evaporate and remove the dispersion medium present in the carbon nanotube layer, the method of the present invention may selectively perform a drying step (S3) at a pressure of 5 pa to 20 pa and a temperature of 60° C. to 90° C. for 5 hours to 7 hours, for example, at a pressure of 10 pa and a temperature of 80° C. for 6 hours.

In a case in which the conductive layer is formed by the above-described method, a thinner conductive layer may be formed in comparison to a case in which the conductive layer is formed by a conventional method of coating with a conductive slurry, and, as a result, the increase in the mass transfer resistance in the conductive layer may be prevented.

That is, since the conductive layer including the porous network structure of carbon nanotubes is disposed on the positive electrode active material layer and the carbon nanotubes in the conductive layer are connected to the carbon nanotubes in the positive electrode active material layer to form a conductive path, the positive electrode of the present invention prepared according to the above-described method may exhibit a significantly improved reduction of the resistance and may have the resultant effect of improving the output characteristics of the battery when using the same amount of the carbon nanotubes in comparison to a case where the carbon nanotubes are mixed and used during the formation of a conventional positive electrode active material layer and a case where the surface of the positive electrode active material is coated with the carbon nanotubes and used. Specifically, in the case that the carbon nanotubes are mixed and used during the formation of the conventional positive electrode active material layer, the probability of contact with the positive electrode active material may be reduced due to a decrease in the amount of the carbon nanotubes on the surface of the active material layer and accordingly, battery characteristics may be degraded. Also, in the case that the surface of the positive electrode active material is coated, cycle characteristics and storage stability may be reduced due to weak connection of the conductive network in the active material layer. In contrast, with respect to the positive electrode according to the embodiment of the present invention, since the conductive network may be uniformly and stably formed in the entire positive electrode active material layer, the charge transfer resistance in the electrode may be significantly reduced and stably improved output characteristics may be achieved. Furthermore, the positive electrode according to the embodiment of the present invention may prevent the increase in the mass transfer resistance into the positive electrode active material layer through the control of the porosity in the structure.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer may be prepared by coating a composition for forming a negative electrode, which selectively includes the binder and the conductive agent as well as the negative electrode active material, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and 249 -caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

Hereinafter, porosities of a positive electrode active material layer and a conductive layer in examples and comparative examples were respectively determined according the following Equations 1 and 2, were converted into volumes based on true density of each material, and were controlled by rolling an electrode to a thickness corresponding to desired porosity.

Porosity of positiv electrode active material layer (%) = [Equation 1]

$$\frac{\left[\text{sample volume} - \left\{\left(\frac{\text{weight of sample}}{\text{true density of sample}}\right) - \left(\frac{\text{weight of current collector}}{\text{true density of current collector}}\right)\right\}\right]}{\text{sample volume}}$$

wherein, the sample volume is 25 cm²×a thickness of the positive electrode active material layer.

Porosity of conductive layer (%) = [Equation 2]

$$\frac{\left[\begin{array}{c}\text{pore volume of sample including} \\ \text{conductive layer} - \\ \text{pore volume of sample} \\ \text{without conductive layer}\end{array}\right]}{\text{conductive layer volume}}$$

wherein, the conductive layer volume is 25 cm²×a thickness of the conductive layer.

Example 1

(Positive Electrode Active Material Preparation)

A Li(Ni$_{0.6}$Mn$_{0.2}$CO$_{0.2}$)O$_2$ positive electrode active material (D$_{50}$=11 μm), first carbon nanotubes (bundle-type carbon nanotubes having a length of a unit: 3 μm, diameter: 10 nm, specific surface area: 300 m²/g, and bulk density: 0.13 kg/m³), and a PVdF binder were mixed in an N-methylpyrrolidone solvent at a weight ratio of 98.02:0.4:1.58 to prepare a composition for forming a positive electrode (viscosity: 5,000 mPa·s), and an aluminum current collector was coated with the composition and dried at 130° C. to prepared a positive electrode assembly (porosity of positive electrode active material layer: 30 vol %).

(Preparation of Composition for Forming Conductive Layer)

0.05 g of second carbon nanotubes (bundle-type carbon nanotubes having a length of a unit: 5 μm, diameter: 10 nm, specific surface area: 300 m²/g, and bulk density: 0.13 kg/m³) was slowly dropped on a surface of 100 ml of isopropyl alcohol, and sonication was then preformed for 10 minutes to prepare a composition for forming a conductive layer in which a layer including a three-dimensional porous network structure composed of the second carbon nanotubes was formed on the surface of the isopropyl alcohol.

(Conductive Layer Preparation)

After impregnating the prepared positive electrode assembly in the composition for forming a conductive layer for 30 seconds, the electrode assembly was gently lifted at a rate of 0.15 m/min for 3 seconds so that the second carbon nanotube layer was disposed on a surface of the positive electrode active material layer, and was dried at 10 Pa and 80° C. for 6 hours to prepare a positive electrode in which a conductive layer was formed on the surface of the positive electrode active material layer (thickness ratio of the positive electrode active material layer to the conductive layer=1:0.002, active material layer porosity=30 vol %, conductive layer porosity=56 vol %, and weight ratio of first carbon nanotubes:second carbon nanotubes=1:0.17) (see FIG. 3) (see Table 1 below).

Example 2

A positive electrode (thickness ratio of the positive electrode active material layer to the conductive layer=1:0.002, porosity in the active material layer=30 vol %, porosity of the conductive layer=56 vol %, and weight ratio of first carbon nanotubes:second carbon nanotubes=1:0.34) (see Table 1 below) was prepared in the same manner as in Example 1 except that a composition for forming a positive electrode (viscosity: 5,000 mPa·s), which was prepared by mixing a Li(Ni$_{0.6}$Mn$_{0.2}$CO$_{0.2}$)O$_2$ positive electrode active material (D$_{50}$=11 μm), first carbon nanotubes (bundle-type carbon nanotubes having a length of a unit: 3 μm, diameter: 10 nm, specific surface area: 300 m²/g, and bulk density: 0.13 kg/m³), and a PVdF binder in an N-methylpyrrolidone solvent at a weight ratio of 98.26:0.2:1.54, was used during the preparation of the positive electrode assembly of Example 1.

Example 3

A positive electrode (thickness ratio of the positive electrode active material layer to the conductive layer=1:0.005, porosity in the active material layer=30 vol %, porosity of the conductive layer=56 vol %, and weight ratio of first carbon nanotubes:second carbon nanotubes=1:0.42) (see Table 1 below) was prepared in the same manner as in Example 1 except that a composition for forming a conductive layer, in which a layer including a three-dimensional porous network structure composed of second carbon nanotubes was formed on a surface of the isopropyl alcohol, was prepared by slowly dropping 0.9 g of the second carbon nanotubes (bundle-type carbon nanotubes having a length of a unit: 7 μm, diameter: 9 nm, specific surface area: 300 m²/g, and bulk density: 0.13 kg/m³) on the surface of 100 ml of the isopropyl alcohol and then performing sonication for 10 minutes, and used during the preparation of the composition for forming a conductive layer of Example 1.

Example 4

A positive electrode (thickness ratio of the positive electrode active material layer to the conductive layer=1:0.001, porosity in the active material layer=30 vol %, porosity of the conductive layer=56 vol %, and weight ratio of first carbon nanotubes:second carbon nanotubes=1:0.08) (see Table 1 below) was prepared in the same manner as in Example 1 except that a composition for forming a conductive layer, in which a layer including a three-dimensional porous network structure composed of second carbon nanotubes was formed on a surface of the isopropyl alcohol, was prepared by slowly dropping 0.5 g of the second carbon nanotubes (bundle-type carbon nanotubes having a length of a unit: 3 μm, diameter: 10 nm, specific surface area: 300 m²/g, and bulk density: 0.13 kg/m³) on the surface of 100 ml of the isopropyl alcohol and then performing sonication for 10 minutes, and used during the preparation of the composition for forming a conductive layer of Example 1.

Comparative Example 1

A positive electrode was prepared in the same manner as in Example 1 except that a conductive layer was not formed on the surface of the positive electrode active material layer in Example 1 (see Table 1 below).

Comparative Example 2

A positive electrode was prepared in the same manner as in Example 1 except that porosity of a conductive layer was reduced to 35% during the formation of the conductive layer in Example 1 (thickness ratio of the positive electrode active material layer to the conductive layer=1:0.002, porosity in the active material layer=30 vol %, porosity of the conductive layer=35 vol %, and weight ratio of first carbon nanotubes:second carbon nanotubes=1:0.1) (see Table 1 below).

Comparative Example 3

A positive electrode was prepared in the same manner as in Example 1 except that an amount of the carbon nanotubes was increased to a ratio of 0.056 with respect to the positive electrode active material layer during the formation of the conductive layer in Example 1 so that there was little difference between the porosity in the conductive layer and the porosity in the positive electrode active material layer (thickness ratio of the positive electrode active material layer to the conductive layer=1:0.056, porosity in the active material layer=30 vol %, porosity of the conductive layer=30 vol %, and weight ratio of first carbon nanotubes: second carbon nanotubes=1:4.7) (see Table 1 below).

Comparative Example 4

A positive electrode was prepared in the same manner as in Example 2 except that a conductive layer was not formed on the surface of the positive electrode active material layer in Example 2 (porosity in the positive electrode active material layer=30 vol %) (see Table 1 below).

Reference Example (Preparation of Composition for Forming Conductive Layer)

0.05 g of second carbon nanotubes (bundle-type carbon nanotubes having a length of a unit: 5 μm, diameter: 10 nm, specific surface area: 300 m$^2$/g, and bulk density: 0.13 kg/m$^3$) was mixed with 100 ml of isopropyl alcohol to prepare a composition for forming a conductive layer.

(Conductive Layer Preparation)

Figure 5:
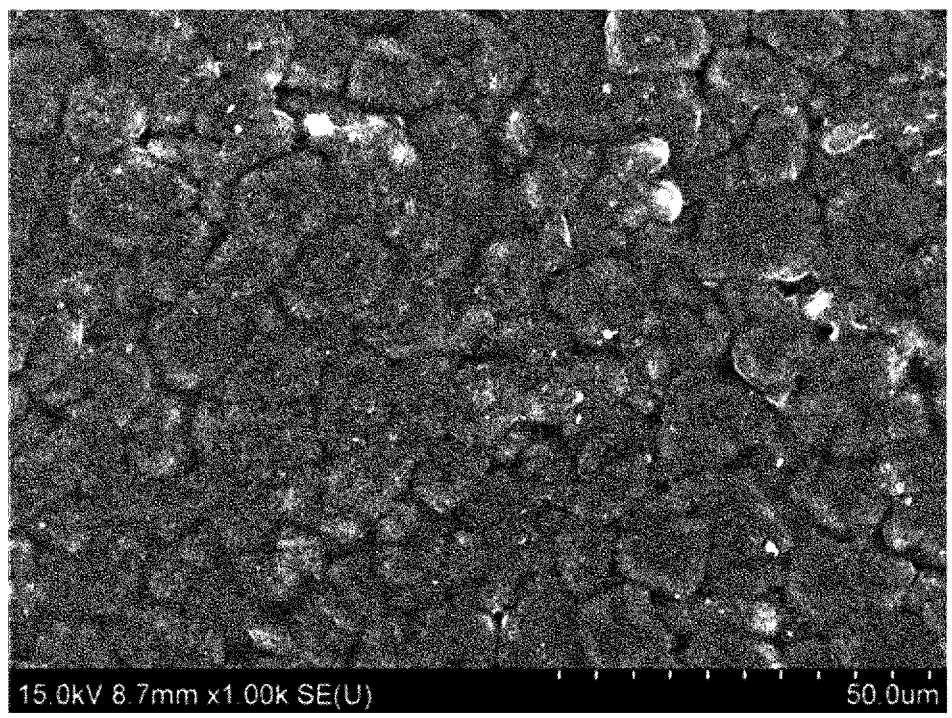
FIG. 5 is an SEM image of the surface of the positive electrode on which a conventional conductive agent layer is coated.

The surface of the positive electrode assembly prepared in Example 1 was directly coated with the composition for forming a conductive layer and then dried to prepare a positive electrode having a conductive layer coated on the surface thereof (see FIG. 5) (thickness ratio of the positive electrode active material layer to the conductive layer=1: 0.02, porosity in the active material layer=30 vol %, porosity of the conductive layer=54 vol %, and weight ratio of first carbon nanotubes:second carbon nanotubes=1:1.6) (see Table 1 below).

TABLE 1

|  | Porosity of the positive electrode active material layer-porosity of the conductive layer (vol %) | Thickness ratio of the positive electrode active material layer: the conductive layer | Weight ratio of first carbon nanotubes: second carbon nanotubes |
|---|---|---|---|
| Example 1 | 26 | 1:0.002 | 1:0.17 |
| Example 2 | 26 | 1:0.002 | 1:0.34 |
| Example 3 | 26 | 1:0.005 | 1:0.42 |

TABLE 1-continued

|  | Porosity of the positive electrode active material layer-porosity of the conductive layer (vol %) | Thickness ratio of the positive electrode active material layer: the conductive layer | Weight ratio of first carbon nanotubes: second carbon nanotubes |
|---|---|---|---|
| Example 4 | 26 | 1:0.001 | 1:0.08 |
| Comparative Example 1 | — | — | — |
| Comparative Example 2 | 5 | 1:0.002 | 1:0.1 |
| Comparative Example 3 | 0 | 1:0.056 | 1:4.7 |
| Comparative Example 4 | — | — | — |
| Reference Example | 24 | 1:0.02 | 1:1.6 |

Preparation Example: Preparation of Lithium Secondary Batteries

Lithium secondary batteries were respectively prepared by using the positive electrodes prepared in Examples 1 to 4, Comparative Examples 1 to 4, and Reference Example.

Specifically, as a negative electrode active material, natural graphite, a carbon black conductive agent, an SBR binder, and carboxymethyl cellulose (CMC) were mixed in an N-methylpyrrolidone solvent at a weight ratio of 96:1:2:1 to prepare a composition for forming a negative electrode, and a copper current collector was coated with the composition to prepare a negative electrode.

Each lithium secondary battery was manufactured by preparing an electrode assembly by disposing a porous polyethylene separator between each of the positive electrodes prepared in Examples 1 to 4, Comparative Examples 1 to 4, and Reference Example and the negative electrode prepared as described above, disposing the electrode assembly in a case, and then injecting an electrolyte solution into the case. In this case, the electrolyte solution was prepared by dissolving 1.0 M lithium hexafluorophosphate (LiPF$_6$) in an organic solvent composed of ethylene carbonate/dimethyl carbonate/ethylmethyl carbonate (mixing volume ratio of EC/DMC/EMC=3/4/3).

Experimental Examples

Experimental Example 1: Rate Capability Evaluation

Figure 6:
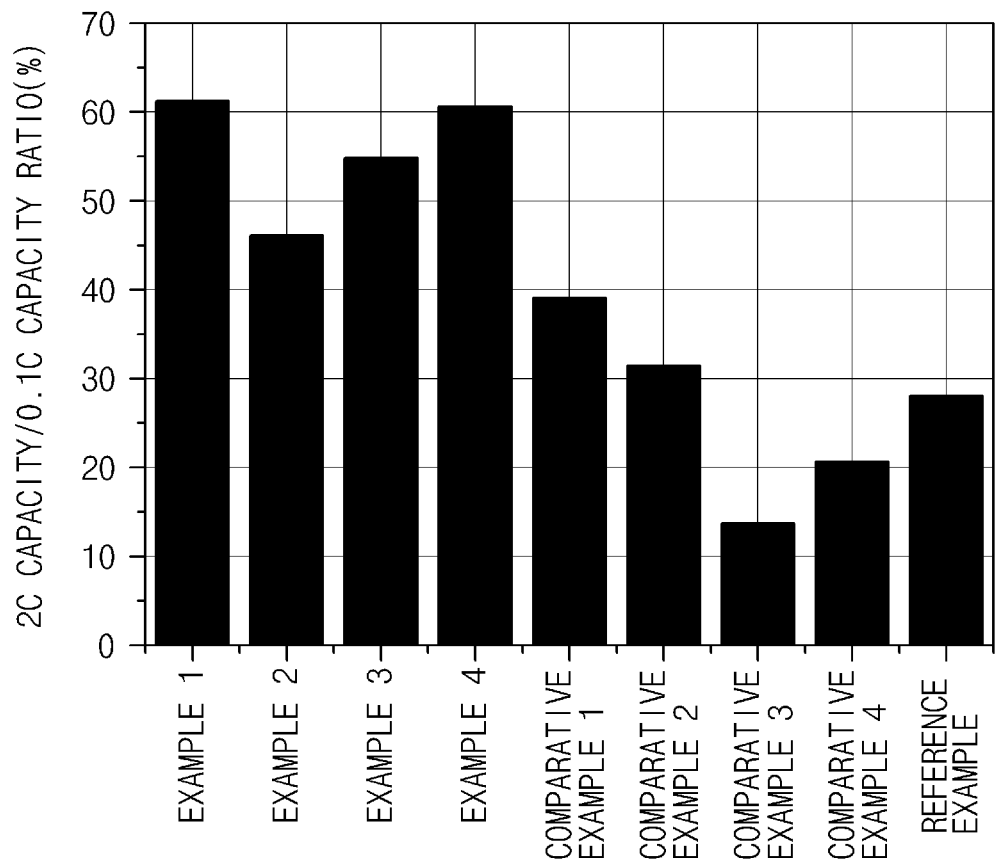
FIG. 6 is a graph showing the evaluation results of rate capabilities of lithium secondary batteries of Examples 1 to 4, Comparative Examples 1 to 4, and Reference Example.

The coin cells (use Li metal negative electrode), which were prepared by using each of the positive electrodes prepared in Examples 1 to 4, Comparative Examples 1 to 4, and Reference Example, were charged at a constant current (CC) of 0.1 C to a voltage of 4.25 V at 25° C., and thereafter, charge in the first cycle was performed by charging the coin cells at a constant voltage (CV) of 4.25 V to a current of 0.05 mAh. After the coin cells were left standing for 20 minutes, the coin cells were discharged at a constant current of 0.1 C to a voltage of 3.0 V to measure discharge capacity in the first cycle. Thereafter, the discharge condition was changed to 2 C, and rate capability was evaluated. The results thereof are presented in the following FIG. 6.

From the experimental results, the positive electrodes of Examples 1 to 4 exhibited excellent rate capabilities in comparison to the positive electrodes of Comparative Examples 1 and 4 in which a conductive layer was not formed, the positive electrode of Comparative Example 2 in which the difference between the porosity in the positive electrode active material layer and the porosity in the conductive layer was small, at less than 10 vol %, and the positive electrode of Comparative Example 3 in which an excessive amount of the carbon nanotubes was included in the conductive layer.

With respect to the positive electrode including the conductive layer of Reference Example which was formed by coating with the slurry for forming a conductive layer using a conventional coating method, it was not only difficult to control the thickness ratio of the positive electrode active material layer to the conductive layer to be equal to or less than 1:0.02, but the conductive layer was also formed on the entire surface of the positive electrode active material layer. Thus, since lithium ions in the electrolyte solution did not smoothly move to the electrode, the rate capability was reduced in comparison to those of the positive electrodes of Examples 1 to 4.

Specifically, the positive electrode of Example 1 exhibited excellent rate capability in comparison to the positive electrode of Comparative Example 1 which included the positive electrode active material layer having the same characteristics, but did not include a conductive layer. Thus, it may be confirmed that the rate capability may be improved by the formation of the conductive layer.

Also, the positive electrode of Example 1 exhibited excellent rate capability in comparison to the positive electrode of Comparative Example 2, which included the positive electrode active material layer and the conductive layer, but had a difference in the porosity between the conductive layer and the positive electrode active material layer of less than 10 vol %, and the positive electrode of Comparative Example 3 in which a thick conductive layer was formed due to the excessive amount of the conductive agent in the conductive layer. The reason for this is that material resistance was increased due to the thickness or low porosity of the conductive layer.

Furthermore, the positive electrode of Example 2 exhibited excellent rate capability in comparison to the positive electrode of Comparative Example 4, which included the positive electrode active material layer having the same characteristics, but did not include a conductive layer, but exhibited somewhat lower rate capability than the positive electrode of Example 1. The reason for this is that, with respect to Example 2, since the amount of the conductive agent in the positive electrode active material layer was reduced in comparison to Example 1, a conductive network was not sufficiently formed in the active material layer.

With respect to the positive electrodes of Examples 1 and 2, since the conductive layer having a network structure, in which the positive electrode active material was partially exposed, was formed in comparison to the positive electrode of Reference Example including the conductive layer which was formed by coating with the slurry for forming a conductive layer, high rate capability may be achieved by suppressing the increase in the mass transfer resistance in the conductive layer.

Experimental Example 2: Resistance Characteristics Evaluation

Resistance characteristics of the lithium secondary batteries of Examples 1 to 4, Comparative Examples 1 to 4, and Reference Example were evaluated by the following method.

Figure 7:
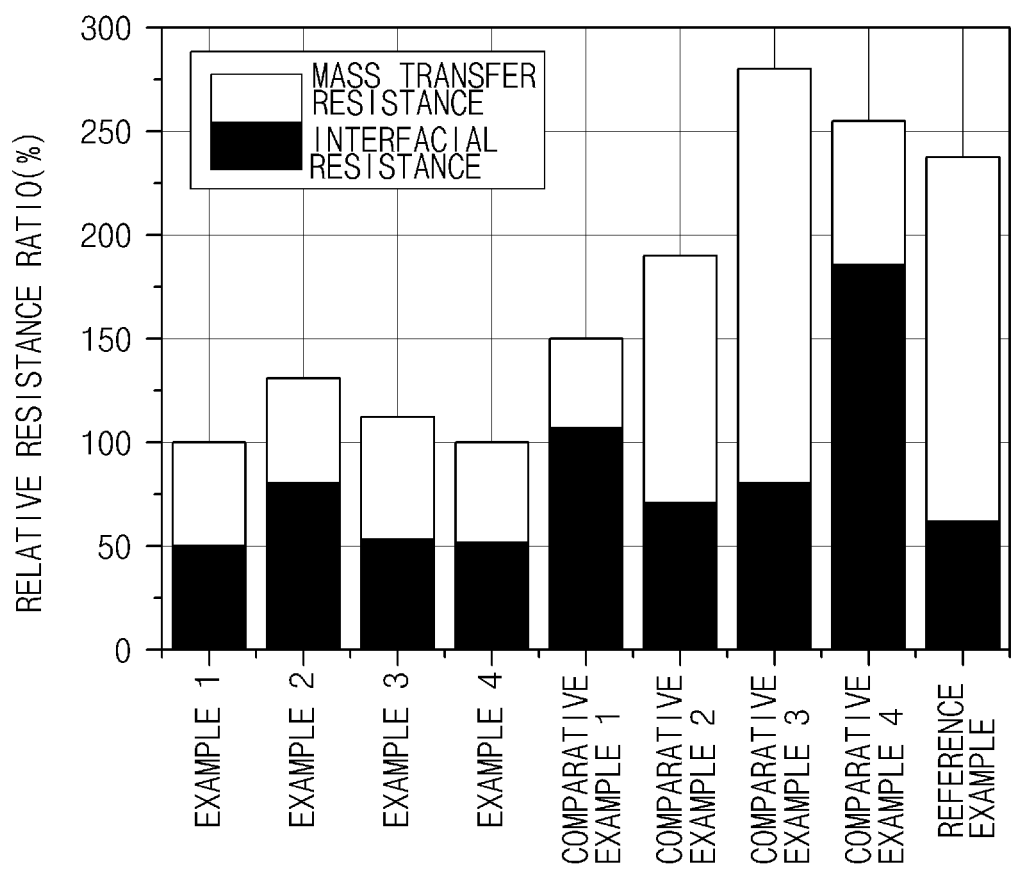
FIG. 7 is a graph showing the measurement results of resistance characteristics of the lithium secondary batteries of Examples 1 to 4, Comparative Examples 1 to 4, and Reference Example.

Specifically, resistance was measured by discharging each battery, which was charged and discharged at room temperature (25° C.), at 2.5 C for 30 seconds based on a SOC of 50%, and interfacial resistance and mass transfer resistance were then separately measured by potentiostat electrochemical impedance spectroscopy (EIS). The results thereof are presented in FIG. 7.

From the experimental results, with respect to the lithium secondary batteries prepared in Examples 1 to 4, it may be understood that, since their interfacial resistances were significantly reduced in comparison to those of Comparative Examples 1 to 4, excellent outputs were obtained. In particular, the interfacial resistance may be significantly reduced by allowing the electrical network to be formed on a surface side thorough the formation of the conductive layer including the carbon nanotubes on the positive electrode active material layer. Also, with respect to Comparative Examples 2 and 3 and Reference Example, it may be confirmed that their interfacial resistances were at an equivalent level or were not significantly increased, but the mass transfer resistances may be reduced by controlling the porosity of each conductive layer.

The invention claimed is:

1. A positive electrode for a secondary battery, the positive electrode consisting of:
    a positive electrode collector;
    a porous positive electrode active material layer disposed on a surface of the positive electrode collector and including a positive electrode active material and first carbon nanotubes; and
    a conductive layer disposed on a surface of the positive electrode active material layer,
    wherein the conductive layer comprises a porous network structure formed by a plurality of second carbon nanotubes and has a porosity equal to or greater than a total of a porosity of the positive electrode active material layer and 10 vol. %, and
    wherein the conductive layer is exposed outside the positive electrode, and
    the conductive layer is prepared by:
    adding the second carbon nanotubes in a dispersion medium to prepare a composition in which a second carbon nanotube layer is formed on a surface of the dispersion medium; and
    impregnating an electrode assembly including the positive electrode active material layer on at least one side of the positive electrode collector in the composition,
    forming the conductive layer exposed outside the positive electrode by lifting the electrode assembly so that the second carbon nanotube layer is disposed on a surface of the positive electrode active material layer.

2. The positive electrode for a secondary battery of claim 1, wherein the porosity of the porous positive electrode active material layer is in a range of 10 vol % to 50 vol %, and the porosity of the conductive layer is in a range of 20 vol % to 60 vol %.

3. The positive electrode for a secondary battery of claim 1, wherein the porous network structure is connected to the first carbon nanotubes in the positive electrode active material layer to form an electrically conductive path.

4. The positive electrode for a secondary battery of claim 1, wherein the first and second carbon nanotubes are each independently bundle carbon nanotubes.

5. The positive electrode for a secondary battery of claim 1, wherein the first and second carbon nanotubes each independently have a diameter of a carbon nanotube unit of 10 nm to 100 nm and a length of the carbon nanotube unit of 3 μm to 10 μm.

6. The positive electrode for a secondary battery of claim 1, wherein the first and second carbon nanotubes each independently have a specific surface area of 20 $m^2/g$ to 2,000 $m^2/g$.

7. The positive electrode for a secondary battery of claim 1, wherein the positive electrode active material has an average particle diameter ($D_{50}$) of 3 μm to 20 μm.

8. The positive electrode for a secondary battery of claim 1, wherein a thickness ratio of the positive electrode active material layer to the conductive layer is in a range of 1:0.001 to 1:0.05.

9. The positive electrode for a secondary battery of claim 8, wherein the thickness ratio of the positive electrode active material layer to the conductive layer is in a range of 1:0.001 to 1:0.01.

10. The positive electrode for a secondary battery of claim 8, wherein the thickness ratio of the positive electrode active material layer to the conductive layer is in a range of 1:0.001 to 1:0.005.

11. The positive electrode for a secondary battery of claim 1, wherein a weight ratio of the first carbon nanotubes to the second carbon nanotubes is in a range of 1:0.08 to 1:0.42.

12. A method of preparing the positive electrode for a secondary battery of claim 1, the method comprising:

adding the second carbon nanotubes in a dispersion medium to prepare a composition for forming a conductive layer in which a second carbon nanotube layer is formed on a surface of the dispersion medium; and after impregnating an electrode assembly including the positive electrode active material layer on at least one side of the positive electrode collector in the composition, forming a conductive layer by lifting the electrode assembly so that the second carbon nanotube layer is disposed on a surface of the positive electrode active material layer.

13. A lithium secondary battery comprising the positive electrode of claim 1.

14. A positive electrode for a secondary battery, the positive electrode consisting of:

a positive electrode collector;

a porous positive electrode active material layer disposed on a surface of the positive electrode collector and including a positive electrode active material and first carbon nanotubes; and a conductive layer disposed on a surface of the positive electrode active material layer, wherein the conductive layer comprises a porous network structure formed by a plurality of second carbon nanotubes and has a porosity equal to or greater than a total of a porosity of the positive electrode active material layer and 10 vol. %, wherein the conductive layer is exposed outside the positive electrode, and wherein a weight ratio of the first carbon nanotubes to the second carbon nanotubes is in a range of 1:0.08 to 1:0.42.

* * * * *